United States Patent
Li et al.

(10) Patent No.: US 12,371,021 B2
(45) Date of Patent: Jul. 29, 2025

(54) TRAILER HITCH ASSIST SYSTEM FOR A VEHICLE AND ASSOCIATED METHODS

(71) Applicant: Toyota Motor Engineering & Manufacturing North America, Inc., Plano, TX (US)

(72) Inventors: Saijian Li, Bethesda, MD (US); Nicholas E. Merkel, Canton, MI (US); Jose David Hernandez Cardenas, Ann Arbor, MI (US); Tomoaki Iida, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 278 days.

(21) Appl. No.: 18/140,879

(22) Filed: Apr. 28, 2023

(65) Prior Publication Data

US 2024/0359690 A1 Oct. 31, 2024

(51) Int. Cl.
*B60W 30/18* (2012.01)
*B60D 1/36* (2006.01)
*G06T 7/73* (2017.01)

(52) U.S. Cl.
CPC ......... *B60W 30/18036* (2013.01); *B60D 1/36* (2013.01); *G06T 7/74* (2017.01);
(Continued)

(58) Field of Classification Search
CPC ...... B60W 30/18036; B60D 1/36; G06T 7/74; G06T 2207/30252; G06T 7/73
See application file for complete search history.

(56) References Cited

U.S. PATENT DOCUMENTS

| | | | |
|---|---|---|---|
| 7,396,035 B1 * | 7/2008 | Smith | B60D 1/36 280/477 |
| 8,798,842 B2 | 8/2014 | Woolf et al. | |

(Continued)

OTHER PUBLICATIONS

Yousef Atoum, "Detecting Objects Under Challenging Illumination Conditions," Ph.D. Dissertation, Michigan State University, 2018, found at https://d.lib.msu.edu/etd/6986/datastream/OBJ/view.

(Continued)

*Primary Examiner* — Kito R Robinson
*Assistant Examiner* — Roy Rhee
(74) *Attorney, Agent, or Firm* — Christopher G. Darrow; Darrow Mustafa PC

(57) ABSTRACT

One embodiment of a trailer hitch assist system analyzes image data from a vehicle camera to detect a reference object on the ground in a first location and stores a first position, within the camera's field of view, of the reference object. The first location is directly beneath the hitch ball of the vehicle. The system analyzes additional image data to detect the reference object on the ground in a second location and stores a second position, within the camera's field of view, of the reference object. The second location is directly beneath the trailer coupler of a trailer. The system calculates a spatial relationship between the first and second locations based on the stored first and second positions and camera parameters. Based on the calculated spatial relationship, the vehicle backs autonomously to align the hitch ball and trailer coupler to permit the trailer to be hitched to the vehicle.

20 Claims, 5 Drawing Sheets

(52) U.S. Cl.
CPC . *B60W 2420/403* (2013.01); *B60W 2554/801* (2020.02); *B60W 2554/802* (2020.02); *G06T 2207/10024* (2013.01); *G06T 2207/30252* (2013.01)

(56) References Cited

U.S. PATENT DOCUMENTS

| | | |
|---|---|---|
| 9,102,271 B2 | 8/2015 | Trombley et al. |
| 11,427,199 B2 | 8/2022 | Niewiadomski et al. |
| 12,071,132 B2 * | 8/2024 | Joseph ............ B60W 30/18036 |
| 2013/0226390 A1 | 8/2013 | Luo et al. |
| 2018/0361929 A1 | 12/2018 | Zhang et al. |
| 2021/0034902 A1 | 2/2021 | Assa et al. |
| 2021/0034903 A1 | 2/2021 | Daga et al. |
| 2021/0170820 A1 | 6/2021 | Zhang |
| 2022/0024391 A1 | 1/2022 | Gali et al. |
| 2022/0032844 A1 | 2/2022 | Karner et al. |
| 2022/0134951 A1 | 5/2022 | Zhang |
| 2022/0212668 A1 | 7/2022 | Joseph et al. |
| 2022/0355735 A1 * | 11/2022 | Kroeze ............. B60W 60/0025 |

OTHER PUBLICATIONS

Yousef Atoum et al., "Monocular Video-Based Trailer Coupler Detection Using Multiplexer Convolutional Neural Network," ICCV Open Access, 2017, found at https://openaccess.thecvf.com/content_ICCV_2017/papers/Atoum_Monocular_Video-Based_Trailer_ICCV_2017_paper.pdf.

* cited by examiner

TRAILER HITCH ASSIST SYSTEM FOR A VEHICLE AND ASSOCIATED METHODS

TECHNICAL FIELD

The subject matter described herein generally relates to vehicles and, more particularly, to a trailer hitch assist system for a vehicle and associated methods.

BACKGROUND

Hitching a trailer to a vehicle can be challenging. Even a frequent trailer user whose vehicle is equipped with a backup camera might require three to five attempts to back the vehicle so the hitch ball of the vehicle and the trailer coupler of the trailer are sufficiently aligned to permit the trailer to be connected with the vehicle. An occasional trailer user might require as many as 10-20 attempts. For such a person, hitching a trailer might take as long as 30-45 minutes.

SUMMARY

A trailer hitch assist system for a vehicle is presented herein. The system comprises a processor and a memory storing machine-readable instructions that, when executed by the processor, cause the processor to analyze first image data from a rear-facing camera of a vehicle to detect a reference object placed on the ground in a first location by a user and store a first position, within a field of view of the rear-facing camera, of the reference object. The first location is beneath and in centered alignment with a hitch ball of the vehicle. The memory also stores machine-readable instructions that, when executed by the processor, cause the processor to analyze second image data from the rear-facing camera to detect the reference object after it has been placed on the ground in a second location by the user and store a second position, within the field of view of the rear-facing camera, of the reference object. The second location is beneath and in centered alignment with a trailer coupler of a trailer. The memory also stores machine-readable instructions that, when executed by the processor, cause the processor to calculate a spatial relationship between the first and second locations based on the stored first and second positions and intrinsic and extrinsic parameters of the rear-facing camera. The memory also stores machine-readable instructions that, when executed by the processor, cause the processor to control the vehicle, based on the calculated spatial relationship, to back autonomously to a location that aligns the hitch ball and the trailer coupler to permit the trailer to be hitched to the vehicle.

Another embodiment is a non-transitory computer-readable medium for hitch assist and storing instructions that, when executed by a processor, cause the processor to analyze first image data from a rear-facing camera of a vehicle to detect a reference object placed on the ground in a first location by a user and store, in a memory, a first position, within a field of view of the rear-facing camera, of the reference object. The first location is beneath and in centered alignment with a hitch ball of the vehicle. The instructions also cause the processor to analyze second image data from the rear-facing camera to detect the reference object after it has been placed on the ground in a second location by the user and store, in the memory, a second position, within the field of view of the rear-facing camera, of the reference object. The second location is beneath and in centered alignment with a trailer coupler of a trailer. The instructions also cause the processor to calculate a spatial relationship between the first and second locations based on the stored first and second positions and intrinsic and extrinsic parameters of the rear-facing camera. The instructions also cause the processor to control the vehicle, based on the calculated spatial relationship, to back autonomously to a location that aligns the hitch ball and the trailer coupler to permit the trailer to be hitched to the vehicle.

In another embodiment, a trailer hitch assist method is disclosed. The method comprises analyzing first image data from a rear-facing camera of a vehicle to detect a reference object placed on the ground in a first location by a user and storing, in a computer memory, a first position, within a field of view of the rear-facing camera, of the reference object. The first location is beneath and in centered alignment with a hitch ball of the vehicle. The method also includes analyzing second image data from the rear-facing camera to detect the reference object after it has been placed on the ground in a second location by the user and storing, in the computer memory, a second position, within the field of view of the rear-facing camera, of the reference object. The second location is beneath and in centered alignment with a trailer coupler of a trailer. The method also includes calculating a spatial relationship between the first and second locations based on the stored first and second positions and intrinsic and extrinsic parameters of the rear-facing camera. The method also includes controlling the vehicle, based on the calculated spatial relationship, to back autonomously to a location that aligns the hitch ball and the trailer coupler to permit the trailer to be hitched to the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
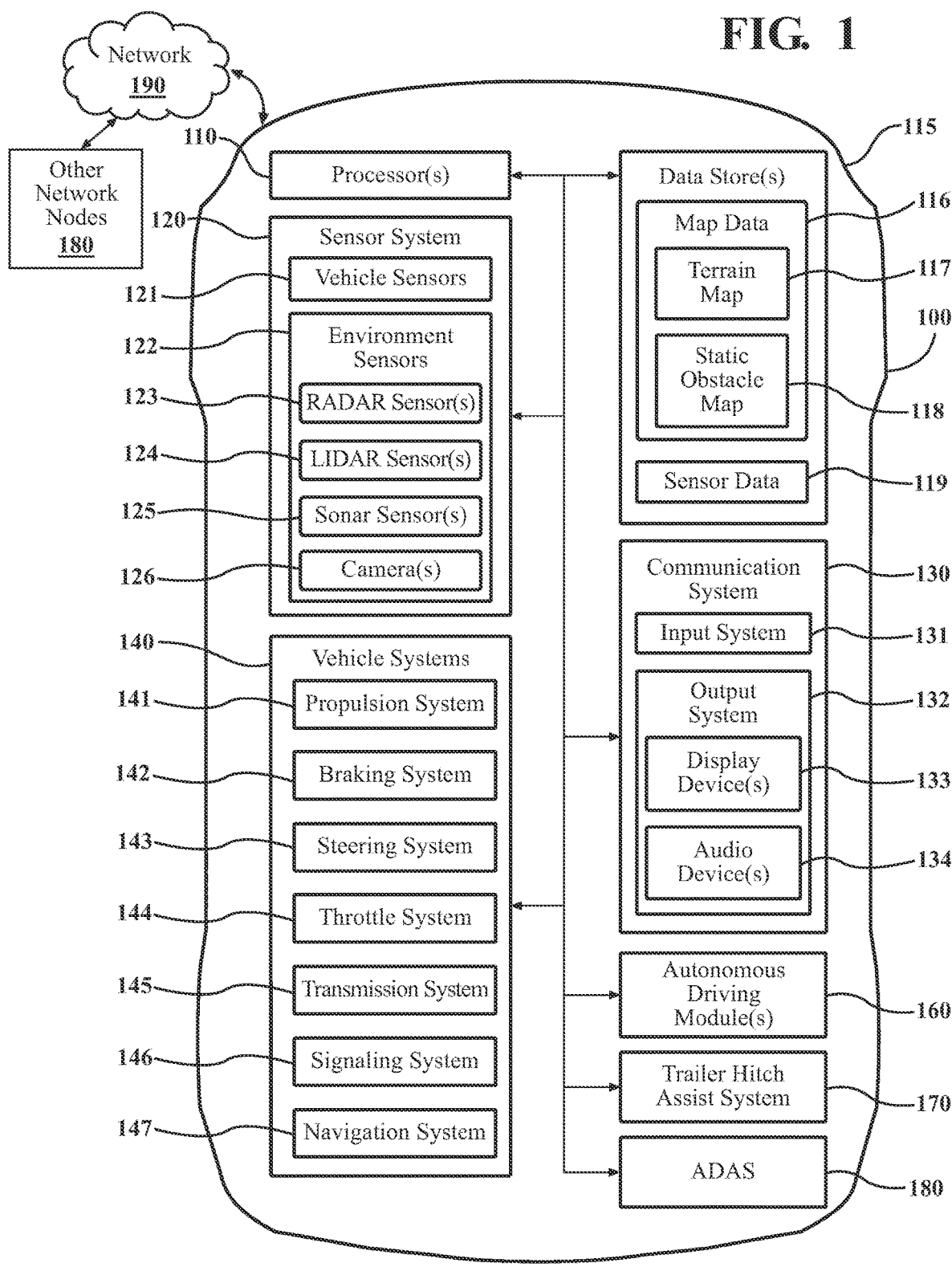
FIG. 1 illustrates one embodiment of a vehicle within which systems and methods disclosed herein may be implemented.

Some current solutions to align the hitch ball of a vehicle with the trailer coupler of a trailer use the vehicle's rear-facing camera (e.g., a backup, reversing, or rearview camera) to detect the hitch ball and trailer coupler directly and then use their position information in the image to assist the driver in aligning them laterally and longitudinally. There are at least three difficulties that arise from this approach. First, the detection accuracy (detecting the hitch ball and trailer coupler) is sometimes degraded by factors such as rust on the hitch ball and/or the trailer coupler being painted black. These factors lead to poor performance at night, in particular. Second, the hitch ball and trailer coupler are necessarily at different heights (the trailer coupler being higher than the hitch ball) with respect to the ground. Consequently, even though the trailer coupler might appear to be aligned with the hitch ball in the image seen on the backup camera, they generally are not correctly aligned in the real world. Third, the driver needing to control the longitudinal position via braking can lead to inaccuracy in positioning (overshooting or undershooting).

Various embodiments of a trailer hitch assist system (hereinafter sometimes referred to as a "hitch assist system") and associated methods described herein improve upon current solutions in several important ways. First, these embodiments provide robust detection. Instead of detecting the hitch ball and trailer coupler directly as objects in the rear-facing camera's field of view (FOV) or image frame, the hitch assist system instead detects a separate reference object placed on the ground directly beneath the hitch ball and, subsequently, directly beneath the trailer coupler. The position, within the backup camera's FOV, of the detected reference object in its first location directly beneath the hitch ball can be saved as calibration data during a Calibration Procedure and recalled during a later Alignment Procedure. During the Alignment Procedure, the reference object is placed in a second location directly beneath the trailer coupler of the trailer. The reference object is designed to be easy to detect in daylight or darkness, as discussed further below.

Second, given knowledge of the rear-facing camera's extrinsic and intrinsic parameters and the first and second positions, within the FOV of the rear-facing camera, of the reference object at the first and second locations, the hitch assist system calculates a spatial relationship (e.g., relative locations in the real world) between the first and second locations of the reference object to enable the vehicle to back up autonomously to a location that aligns the hitch ball and trailer coupler. With the hitch ball and trailer coupler properly aligned, the trailer can be hitched to the vehicle (i.e., the trailer can be connected with the vehicle for towing).

An important concept in the various embodiments described herein is that the reference object, when it is in both the first and second positions described above, lies in the same plane the ground. This common reference plane makes possible the accurate calculation of the spatial relationship discussed above and supports accurate graphical status information on an in-vehicle display or mobile device during both calibration and alignment.

Throughout the remainder of this Description, the terms "rear-facing camera" and "backup camera" are used interchangeably. As noted above, such a camera is sometimes also referred to in the art as a "reversing camera" or a "rearview camera."

Referring to FIG. 1, an example of a vehicle 100, in which systems and methods disclosed herein can be implemented, is illustrated. As used herein, a "vehicle" is any form of motorized land transport. One example of a "vehicle," without limitation, is an automobile. In some embodiments, vehicle 100 can operate, at least some of the time via autonomous driving module(s) 160, in a mode that achieves a high degree of autonomy or full autonomy (e.g., autonomy Levels 3-5). In other embodiments, vehicle 100 includes an intelligent driving assistance system such as an Advanced Driver-Assistance System (ADAS) 180 to assist a human driver in various ways, some of which involve at least some degree of autonomous driving (e.g., automatic parking assist, automatic collision avoidance, and, in the context of the embodiments disclosed herein, automatic trailer hitch assist). As shown in FIG. 1, vehicle 100 can include a trailer hitch assist system 170 to benefit from the functionality discussed herein. Trailer hitch assist system 170, depending on the embodiment, can be an aspect or feature of the autonomous driving module(s) 160 or ADAS 180 of vehicle 100.

The vehicle 100 includes various other elements, as shown in FIG. 1. It will be understood that, in various implementations, it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including trailer hitch assist system 170. While the various elements are shown as being located within the vehicle 100 in FIG. 1, it will be understood that one or more of these elements can be located external to the vehicle 100. Further, the elements shown may be physically separated by large distances. As shown in FIG. 1, in some embodiments, vehicle 100 can communicate with other network nodes 185 (e.g., other connected vehicles, cloud servers, edge servers, roadside units, infrastructure, and mobile devices) via a network 190. In some embodiments, network 190 is built using technology such as cellular data (LTE®, 5G, 6G, etc.) and includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, LIDAR sensor(s) 124, sonar sensor(s) 125, and camera(s) 126. Of particular interest in the context of various embodiments of a trailer hitch assist system 170 described herein is a rear-facing camera such as a backup, reversing, or rearview camera. The images/video output by such a camera can be displayed to vehicle occupants on one or more display devices 133 of communication system 130. For example, in some embodiments, vehicle 100 is equipped with a display device 133 mounted near the center of the dashboard of the vehicle. Such a display device 133, in some embodiments, enables a user to access vehicle features and settings, including trailer hitch assist system 170, via a touchscreen user interface.

One or more of these various types of environment sensors 122 can be used to detect objects (e.g., external road agents such as other vehicles, bicyclists, motorcyclists, pedestrians, and animals) and, in other respects, understand the environment surrounding vehicle 100 and its associated traffic situations and conditions. This process is sometimes referred to as "traffic-situation understanding" or "scene understanding." In some embodiments, this analysis of the external environment and traffic situations can be carried out entirely or in part by ADAS 180. In embodiments in which vehicle 100 is capable of highly or fully autonomous operation, vehicle 100 includes autonomous driving module(s) 160. The autonomous driving module(s) 160 may be part of an autonomous-driving subsystem of vehicle 100 that controls various vehicle systems 140 such as propulsion system 141, braking system 142, and steering system 143.

More specifically, trailer hitch assist system 170 analyzes image data from the rear-facing camera 126 using various machine-vision techniques and algorithms such as object detection, object recognition, semantic segmentation, instance segmentation, etc., to detect and recognize a reference object that a user (e.g., vehicle owner, driver) has placed on the ground directly beneath the hitch ball of vehicle 100 or the trailer coupler of the trailer. This is explained in greater detail below.

Figure 2:
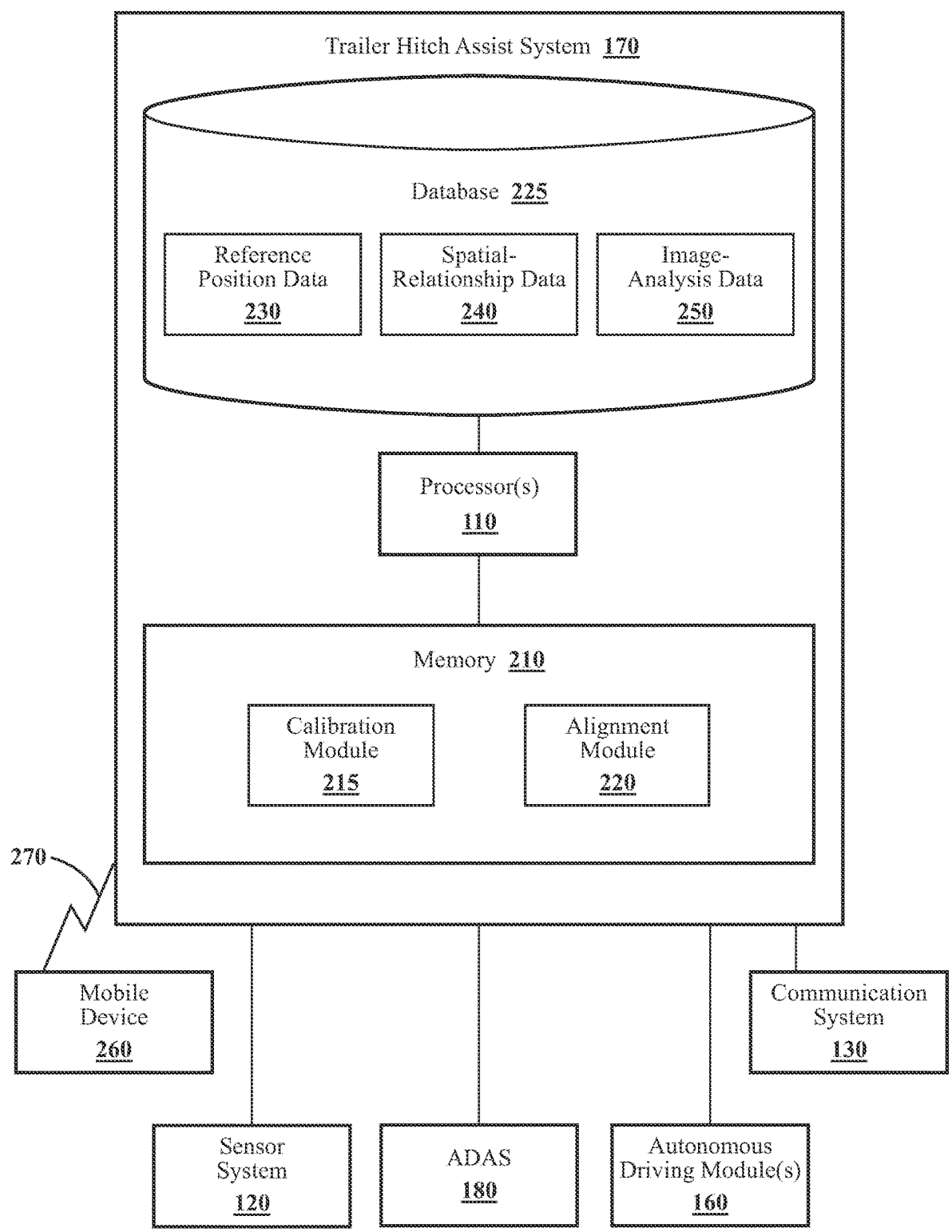
FIG. 2 is a block diagram of one embodiment of a trailer hitch assist system.

FIG. 2 is a block diagram of a trailer hitch assist system 170, in accordance with an illustrative embodiment of the invention. In the embodiment of FIG. 2, trailer hitch assist system 170 is shown as including one or more processors 110 from the vehicle 100 of FIG. 1. In general, the one or more processors 110 may be a part of trailer hitch assist system 170, trailer hitch assist system 170 may include one or more separate processors from the one or more processors 110 of the vehicle 100, or trailer hitch assist system 170 may access the one or more processors 110 through a data bus or another communication path, depending on the embodiment.

In the embodiment of FIG. 2, memory 210 stores a calibration module 215 and an alignment module 220. The memory 210 is a random-access memory (RAM), read-only memory (ROM), a hard-disk drive, a flash memory, or other suitable memory for storing the modules 215 and 220. The modules 215 and 220 are, for example, computer-readable (machine-readable) instructions that, when executed by the one or more processors 110, cause the one or more processors 110 to perform the various functions disclosed herein.

Trailer hitch assist system 170 can store various kinds of data in a database 225 or other computer memory that coincides with or is separate from memory 210. Examples include reference position data 230, spatial-relationship data 240, and image-analysis data 250. These types of data are discussed further below.

In some embodiments, the Human-Machine Interface (HMI) or user interface (UI) by which a human user (e.g., vehicle 100 owner or driver) activates and controls trailer hitch assist system 170 includes a touchscreen display device 133 mounted in the dashboard of vehicle 100. In some embodiments, this is the same display device 133 that displays images/video from the backup camera 126 of vehicle 100. In these embodiments, the user activates and controls trailer hitch assist system 170 via various icons or virtual buttons displayed on the touchscreen.

In other embodiments, a display-based HMI is supplemented by one or more buttons, knobs, or switches in vehicle 100. For example, such UI elements can include an "Activate/Deactivate" button, a "Calibrate" button, an "Enter/Confirm" button, an "Align" button, a "Cancel" button, or other buttons to control various aspects of trailer hitch assist system 170.

In still other embodiments, the HMI for activating and controlling trailer hitch assist system 170 includes a mobile device 260 associated with the user. For example, in some embodiments, mobile device 260 is a smartphone that runs an app for activating and controlling trailer hitch assist system 170. In these embodiments, mobile device 260 communicates with trailer hitch assist system 170 in vehicle 100 via a short-range wireless communication link 270 (e.g., Bluetooth®) or via a cellular data connection over network 190 (refer to FIG. 1). In other embodiments, mobile device 260 is the user's key fob for vehicle 100, and the key fob acts as a wireless remote-control device to activate and control the operation of trailer hitch assist system 170. In those embodiments, the key fob can include one or more buttons pertaining to trailer hitch assist system 170, such as "Calibrate," "Align," "Enter/Confirm," etc.

Before describing the functions performed by calibration module 215 and alignment module 220, an complete overview of the operation of trailer hitch assist system 170 will first be provided with reference to FIGS. 3A, 3B, 4A, and 4B. In various embodiments, the process of automatically aligning the hitch ball of vehicle 100 with the trailer coupler of a trailer is divided into a Calibration Procedure and an Alignment Procedure, the former preceding the latter in time.

Figure 3A:
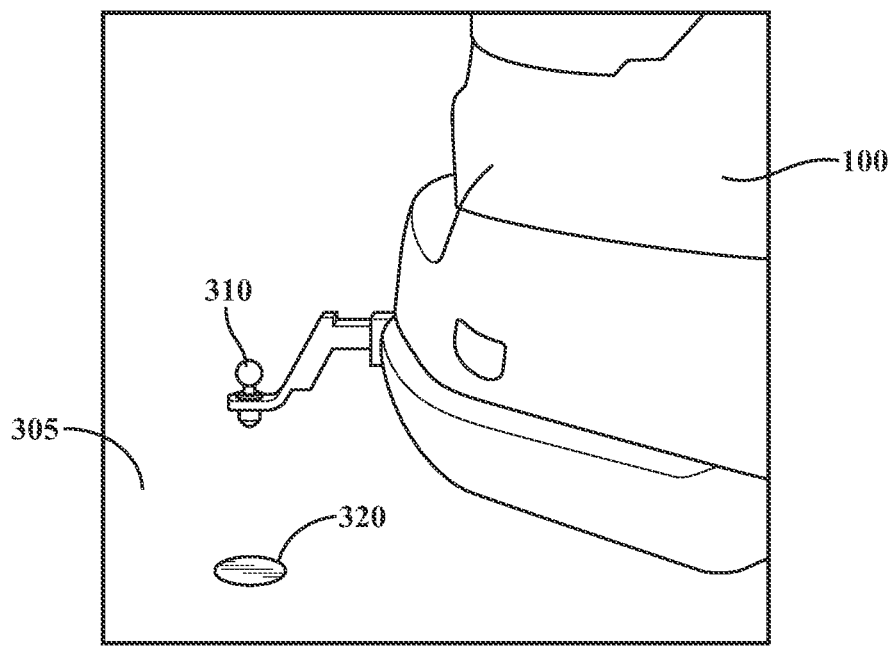
FIG. 3A illustrates a reference object placed on the ground directly beneath the hitch ball of a vehicle, in accordance with an illustrative embodiment of the invention.

The user initiates the Calibration Procedure via a HMI like those described above. For example, the user might actuate a "Calibrate" user-interface element. During the Calibration Procedure, the user places the reference object 320 in a first location on the ground 305 directly beneath the hitch ball 310 of vehicle 100, as illustrated in FIG. 3A. That is, the user places the reference object 320 on the ground 305 beneath (below) the hitch ball 310 in centered alignment with the hitch ball 310, meaning the center of the reference object 320 is aligned vertically with the center of the hitch ball 310. In some embodiments, the user informs trailer hitch assist system 170, via the HMI, what color the reference object 320 is to aid detection.

Figure 3B:
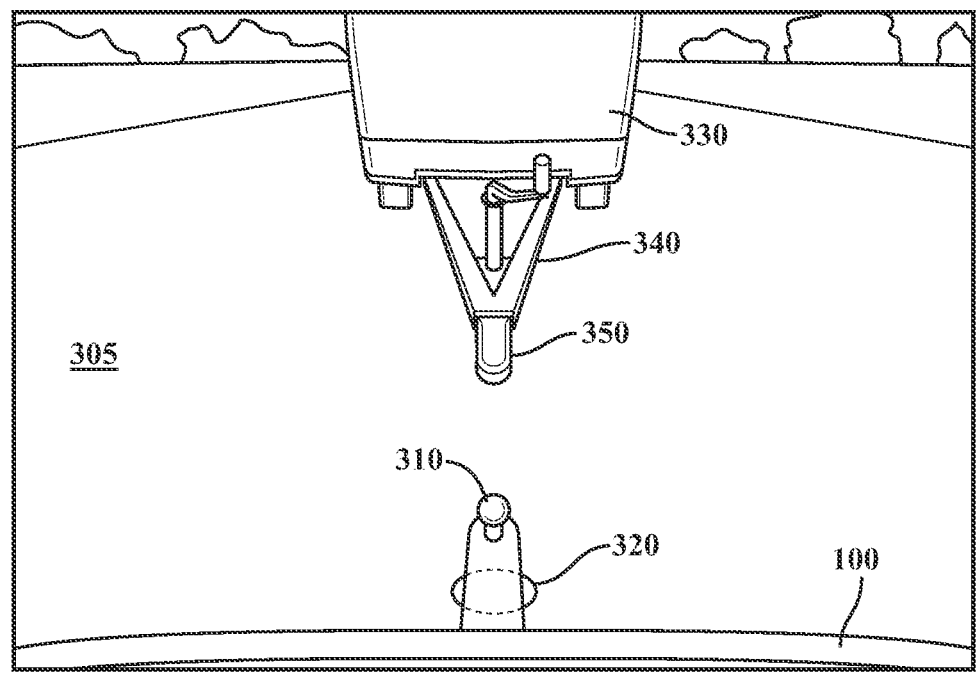
FIG. 3B illustrates a view from the perspective of a backup camera of a vehicle, in which a reference object has been placed on the ground directly beneath the vehicle's hitch ball, in accordance with an illustrative embodiment of the invention.

Trailer hitch assist system 170 analyzes image data from backup camera 126 to detect the reference object and calculates reference position data 230 for the detected reference object in the first location. This is illustrated from the perspective of backup camera 126 in FIG. 3B. In FIG. 3B, trailer hitch assist system 170 has detected reference object

320, which the user placed on the ground 305 directly beneath hitch ball 310 of vehicle 100. Also visible in FIG. 3B is a trailer 330 having a drawbar 340 and a trailer coupler 350. The bumper of vehicle 100 and hitch ball 310 are also depicted in FIG. 3B.

It should be noted that the reference position data 230 just mentioned is with respect to the FOV or image frame of the backup camera 126. For example, in an embodiment employing a circular reference object, the reference position data 230 might include the position (e.g., two-dimensional pixel coordinates within the FOV or image frame) of the center of the detected reference object 320 and the detected reference object's diameter (in pixels or converted to real-world units such as inches).

In some embodiments, based on the reference position data 230, trailer hitch assist system 170 draws, on a display device 133, a hitch-ball reference graphic representing the detected reference object 320 in the first position. In some embodiments, to help a user confirm correct detection of the reference object 320, trailer hitch assist system 170 renders the hitch-ball reference graphic in a different color than that of the actual reference object 320. In some embodiments, the user expressly confirms, via the HMI, successful detection of the reference object 320.

Trailer hitch assist system 170 stores, in database 225 for future use, the reference position data 230 corresponding to the reference object in the first location ("hitch-ball reference position data 230"). In fact, so long as the hitch ball 310 of vehicle 100 is not repositioned (e.g., bumped or bent) or replaced with a different kind of hitch ball 310, the stored hitch-ball reference position data 230 obtained during the Calibration Procedure can be reused indefinitely during subsequent repetitions of the Alignment Procedure that will be described in detail below. Once the Calibration Procedure is complete, the user can remove the reference object 320 from its first location directly beneath the hitch ball 310.

Figure 4A:
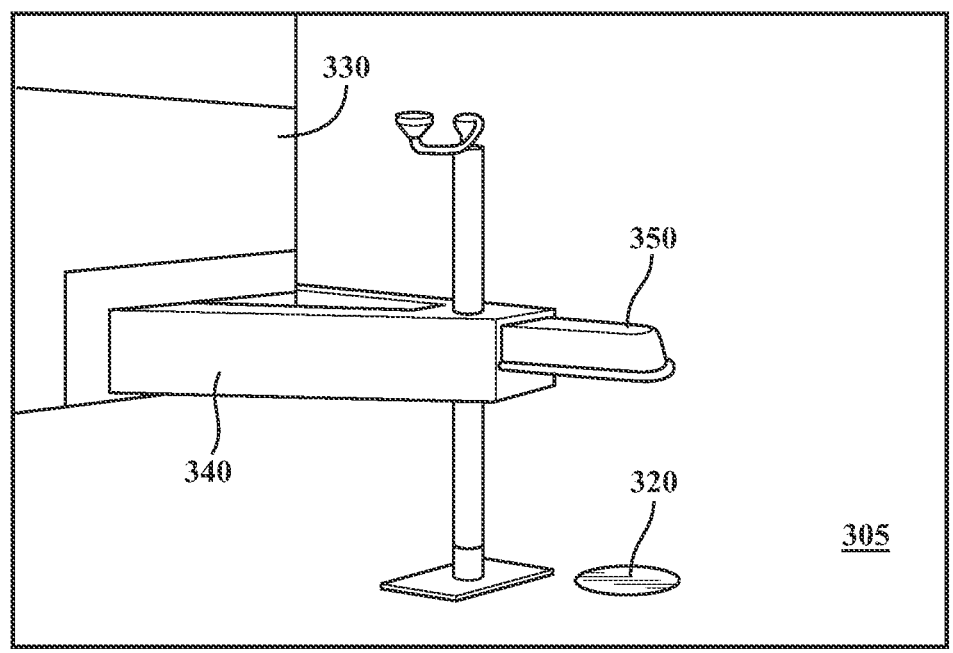
FIG. 4A illustrates a reference object placed on the ground directly beneath the trailer coupler of a trailer, in accordance with an illustrative embodiment of the invention.

When the user desires to hitch the trailer 330 to vehicle 100, the user places the reference object 320 in a second location on the ground 305 directly beneath the trailer's trailer coupler 350, as illustrated in FIG. 4A. That is, the user places the reference object 320 on the ground 305 beneath (below) the trailer coupler 350 in centered alignment with the trailer coupler 350, meaning the center of the reference object 320 is aligned vertically with the center of the trailer coupler 350.

The user initiates the Alignment Procedure via the HMI. Trailer hitch assist system 170 analyzes image data from backup camera 126 to detect the reference object 320 and calculates reference position data 230, as explained above, for the detected reference object 320 in the second location ("trailer-coupler reference position data 230"). Trailer hitch assist system 170 can save, in database 225, the trailer-coupler reference position data 230 along with the hitch-ball reference position data 230 discussed above in connection with the Calibration Procedure.

Trailer hitch assist system 170 draws, on display device 133, a trailer-coupler reference graphic representing the detected reference object 320 in the second location. Using the previously stored hitch-ball reference position data 230 from the Calibration Procedure, trailer hitch assist system 170 also draws, on display device 133, a hitch-ball reference graphic representing the reference object 320 in the first location. As with the hitch-ball reference graphic, in rendering the trailer-coupler reference graphic, trailer hitch assist system 170, in some embodiments, renders the trailer-coupler reference graphic in a color different from that of the actual reference object 320 to assist the user in verifying accurate detection. In some embodiments, the user expressly confirms, via the HMI, correct detection of the reference object in the second location.

Based on the stored hitch-ball and trailer-coupler reference position data 230 for the reference object 320 in the first and second locations, respectively, and a knowledge of the extrinsic and intrinsic parameters of backup camera 126, trailer hitch assist system 170 calculates a spatial relationship, in the real world, between the first position of the reference object 320 and the second position of the reference object 320. As indicated in FIG. 2, this spatial-relationship can be stored in database 225 as spatial-relationship data 240. In some embodiments, the calculated spatial relationship includes the relative real-world locations, on the ground 305, of the first and second locations of the reference object 320. The calculated spatial relationship can also include the computed distance between the two relative real-world locations. As those skilled in the art will recognize, extrinsic camera parameters can include, for example, the height of backup camera 126 from the ground and the angles (pitch angle, yaw angle, roll angle), with respect to the ground, at which backup camera 126 is aimed. Intrinsic parameters can include, for example, focal length, aperture, FOV, and resolution.

Trailer hitch assist system 170 uses well-known geometric principles and techniques to calculate the spatial relationship, in the real world, between the first and second locations of the reference object 320 based on the corresponding stored hitch-ball and trailer-coupler reference position data 230. A central concept in the various embodiments described herein is that of mathematically mapping positions within the FOV of the backup camera 126 to corresponding real-world locations of the reference object 320 associated with the hitch ball 310 and trailer coupler 350. The ground-based reference object 320 being placed, in turn, in the two locations discussed above (directly beneath the hitch ball 310 and directly beneath the trailer coupler 350) supports this mathematical mapping between the image domain and the real world because the reference object 320, in both the first and second locations, remains in the same plane (i.e., the ground 305). This common reference plane removes uncertainty in the image analysis due to the hitch ball 310 and the trailer coupler 350 being at different heights above the ground.

Based on the calculated spatial relationship between the first and second locations of the reference object 320, trailer hitch assist system 170, via autonomous driving module(s) 160 or ADAS 180, causes vehicle 100 to back (drive in reverse) autonomously to a location that aligns the hitch ball 310 of vehicle 100 with the trailer coupler 350 of the trailer 330 to permit the trailer 330 to be hitched to the vehicle 100. For example, trailer hitch assist system 170 can determine a trajectory that will enable vehicle 100 to drive autonomously in reverse (backward) to the location that aligns the hitch ball 310 and the trailer coupler 350. In this context, "aligned" means the center of the hitch ball 310 and the center of the trailer coupler 350 are approximately in a vertical line. Thus, they are approximately in centered alignment with each other. Accuracy to within half the diameter of the hitch ball 310 in both lateral and longitudinal directions is generally sufficient. Since typical hitch-ball diameters are 1 and ⅞ inches to 2 and 5/16 inches, accuracy to within approximately one inch in both lateral and longitudinal directions is sufficient to permit the trailer 330 to be connected with vehicle 100. As those skilled in the art are aware, connecting the trailer 330 with the vehicle 100 includes flipping the trailer coupler's lever to its locking position, clamping the hitch ball 310.

As those skilled in the art also understand, autonomous driving module(s) 160 or ADAS 180 accomplish autonomous backing (driving in reverse) by controlling various vehicle systems 140 such as propulsion system 141, braking system 142, and steering system 143 (refer to FIG. 1).

Figure 4B:
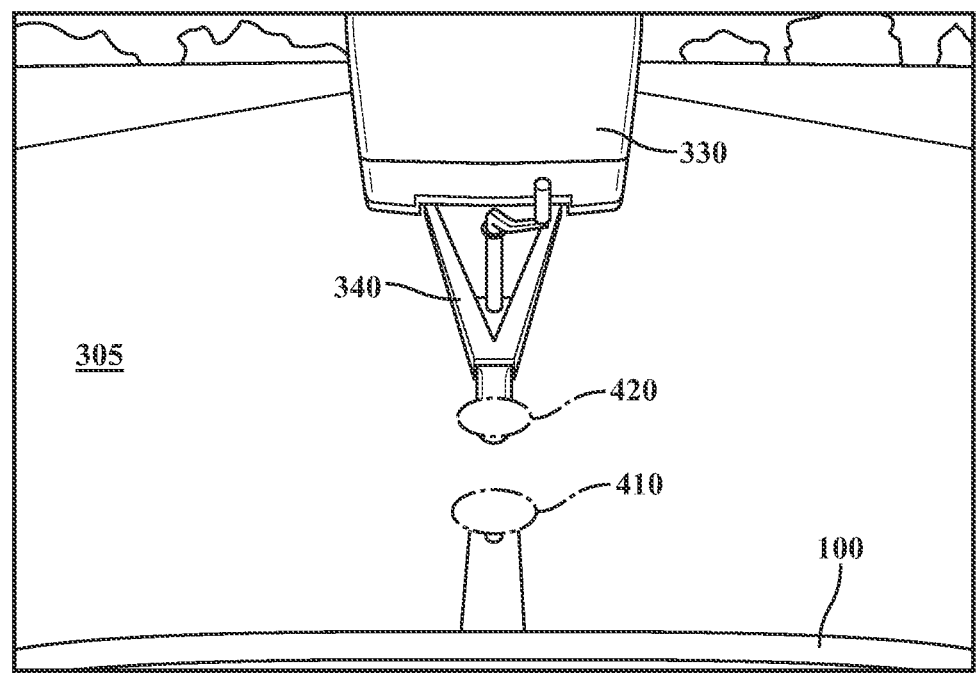
FIG. 4B illustrates a view from the perspective of a backup camera of a vehicle, in which a vehicle is being backed autonomously to align the hitch ball with the trailer coupler, in accordance with an illustrative embodiment of the invention.

In some embodiments, as vehicle 100 is backing autonomously to align the hitch ball 310 and trailer coupler 350, trailer hitch assist system 170 shows, on display device 133, the hitch-ball reference graphic 410 animatedly moving toward the trailer-coupler reference graphic 420, as illustrated in FIG. 4B. When the two graphical representations (410 and 420) are aligned with each other (on top of each other) on display device 133, the hitch ball 310 and trailer coupler 350 are physically aligned in the real world.

In some embodiments, status notifications and instructional prompts are provided to the user on display device 133 during both the Calibration Procedure and the Alignment Procedure. For example, during the Calibration Procedure, trailer hitch assist system 170 can display text such as "Calibrating" and "Calibrated" on display device 133. During the Alignment Procedure, trailer hitch assist system 170 can display text such as "Aligning" and "Aligned" on display device 133. In an embodiment in which the HMI includes the use of a mobile device 260 (e.g., a smartphone), similar prompts and notifications can be displayed on the mobile device 260. In an embodiment in which the user activates and controls trailer hitch assist system 170 using a key fob from outside vehicle 100, trailer hitch assist system 170 can use various audible tones, beeps, and/or recorded or computer-synthesized spoken messages to provide the prompts and notifications.

The reference object 320 can take different forms, depending on the embodiment. In one embodiment, the reference object 320 is a thin plastic circular disk (e.g., a few millimeters thick, in one embodiment) having a color (e.g., white, yellow, red, lime green, etc.) that contrasts with the ground 305. In other embodiments, the reference object is made of a different material (e.g., metal, cardboard, wood, fiberglass, polymer, etc.). In some embodiments, the reference object 320 is illuminated by a powered light source, or the reference object 320 includes a phosphorescent material so that the reference object 320 is visible to backup camera 126 in darkness. In an embodiment in which the reference object 320 is a thin circular disk, the diameter of the disk can vary, depending on the embodiment. In some embodiments, the reference object 320 has a diameter of between 4 and 20 inches. In some embodiments, the reference object 320 can have a shape other than circular (e.g., square, hexagonal, etc.). As those skilled in the art will recognize, however, it is advantageous for the reference object 320 to be circular because of its geometrical symmetry in all directions from which a vehicle 100 could potentially back toward the trailer 330 to align the hitch ball 310 and trailer coupler 350.

Referring once again to FIG. 2, calibration module 215 generally includes instructions that, when executed by the one or more processors 110, cause the one or more processors 110 to analyze image data from the rear-facing camera 126 of vehicle 100 to detect a reference object 320 placed on the ground 305 in a first location by the user and to store a first position (230), within the FOV or image frame of the rear-facing camera 126, of the detected reference object 320. As discussed above, the first location is beneath and in centered alignment with the hitch ball 310 of the vehicle 100. The stored first position just mentioned is the hitch-ball reference position data 230 discussed above.

In performing machine-vision techniques and algorithms such as object detection, object recognition, semantic segmentation, instance segmentation, etc., to detect and recognize the reference object 320, calibration module 215 can store various kinds of image-analysis data 250 in database 225. Also, calibration module 215 controls the various HMI-related functions discussed above in connection with the Calibration Procedure and FIGS. 3A and 3B.

Alignment module 220 generally includes instructions that, when executed by the one or more processors 110, cause the one or more processors 110 to analyze image data from the rear-facing camera 126 to detect the reference object 320 after it has been placed on the ground 305 in a second location by the user and to store a second position (230), within the FOV of the rear-facing camera 126, of the reference object 320. As discussed above, the second location is beneath and in centered alignment with the trailer coupler 350 of the trailer 330. The stored second position just mentioned is the trailer-coupler reference position data 230 discussed above. Alignment module 220 performs these functions during the Alignment Procedure discussed above in connection with FIGS. 4A and 4B.

In performing machine-vision techniques and algorithms such as object detection, object recognition, semantic segmentation, instance segmentation, etc., to detect and recognize the reference object 320, alignment module 220 can store various kinds of image-analysis data 250 in database 225.

Alignment module 220 also includes machine-readable instructions that, when executed by the one or more processors 110, cause the one or more processors 110 to calculate a spatial relationship (240) between the first and second locations of the reference object 320 based on the stored first and second positions (hitch-ball reference position data and trailer-coupler reference position data 230) and intrinsic and extrinsic parameters of the rear-facing camera 126. This is discussed in greater detail above in connection with the Alignment Procedure.

Alignment module 220 also includes machine-readable instructions that, when executed by the one or more processors 110, cause the one or more processors 110 to control the vehicle 100, based on the calculated spatial relationship (240), to back autonomously to a location that aligns the hitch ball 310 and the trailer coupler 350 to permit the trailer 330 to be hitched to the vehicle 100. This aspect of the Alignment Procedure is discussed in greater detail above. As discussed above, alignment module 220 accomplishes the autonomous backing (driving in reverse) via autonomous driving module(s) 160 or ADAS 180, depending on the embodiment. Also, alignment module 220 controls the various HMI-related functions discussed above in connection with the Alignment Procedure and FIGS. 4A and 4B, including displaying hitch-ball reference graphic 410 and trailer-coupler reference graphic 420 on display device 133 during automated backing of vehicle 100 to align hitch ball 310 with trailer coupler 350.

Figure 5:
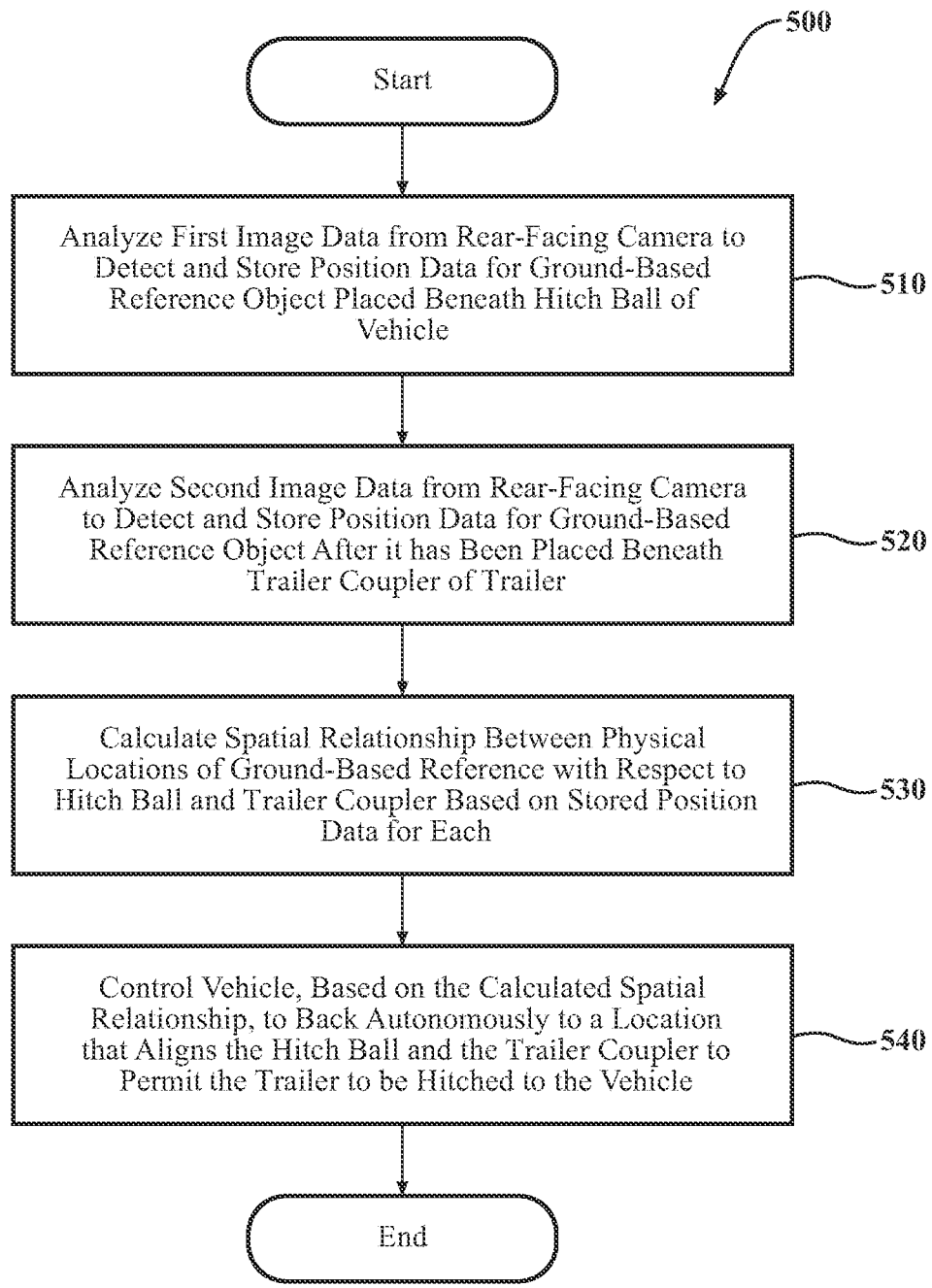
FIG. 5 is a flowchart of a trailer hitch assist method, in accordance with an illustrative embodiment of the invention.

FIG. 5 is a flowchart of a trailer hitch assist method 500 ("method 500"), in accordance with an illustrative embodiment of the invention. Method 500 will be discussed from the perspective of the trailer hitch assist system 170 in FIG. 2. While method 500 is discussed in combination with trailer hitch assist system 170, it should be appreciated that method 500 is not limited to being implemented within trailer hitch assist system 170, but trailer hitch assist system 170 is instead one example of a system that may implement method 500.

At block 510, calibration module 215 analyzes image data from the rear-facing camera 126 of vehicle 100 to detect a reference object 320 placed on the ground 305 in a first location by the user and stores a first position (230), within the FOV or image frame of the rear-facing camera 126, of the detected reference object 320. As discussed above, the first location is beneath and in centered alignment with the hitch ball 310 of the vehicle 100. The stored first position just mentioned is the hitch-ball reference position data 230 discussed above. In performing machine-vision techniques and algorithms such as object detection, object recognition, semantic segmentation, instance segmentation, etc., to detect and recognize the reference object 320, calibration module 215 can store various kinds of image-analysis data 250 in database 225, as discussed above. Also, calibration module 215 controls the various HMI-related functions discussed above in connection with the Calibration Procedure and FIGS. 3A and 3B.

At block 520, alignment module 220 analyzes image data from the rear-facing camera 126 to detect the reference object 320 after it has been placed on the ground 305 in a second location by the user and stores a second position (230), within the FOV of the rear-facing camera 126, of the reference object 320. As discussed above, the second location is beneath and in centered alignment with the trailer coupler 350 of the trailer 330. The stored second position just mentioned is the trailer-coupler reference position data 230 discussed above. Alignment module 220 performs these functions during the Alignment Procedure discussed above in connection with FIGS. 4A and 4B. In performing machine-vision techniques and algorithms such as object detection, object recognition, semantic segmentation, instance segmentation, etc., to detect and recognize the reference object 320, alignment module 220 can store various kinds of image-analysis data 250 in database 225.

At block 530, alignment module 220 calculates a spatial relationship (240) between the first and second locations of the reference object 320 based on the stored first and second positions (hitch-ball reference position data 230 and trailer-coupler reference position data 230) and intrinsic and extrinsic parameters of the rear-facing camera 126. This is discussed in greater detail above in connection with the Alignment Procedure.

At block 540, alignment module 220 controls the vehicle 100, based on the calculated spatial relationship (240), to back autonomously to a location that aligns the hitch ball 310 and the trailer coupler 350 to permit the trailer 330 to be hitched to the vehicle 100. This aspect of the Alignment Procedure is discussed in greater detail above. As discussed above, alignment module 220 accomplishes the autonomous backing (driving in reverse) via autonomous driving module(s) 160 or ADAS 180, depending on the embodiment. Also, alignment module 220 controls the various HMI-related functions discussed above in connection with the Alignment Procedure and FIGS. 4A and 4B, including displaying hitch-ball reference graphic 410 and trailer-coupler reference graphic 420 on display device 133 during automated backing of vehicle 100 to align hitch ball 310 with trailer coupler 350.

As discussed above, the reference object 320 can take different forms and have different features, depending on the embodiment.

To promote clarity in the claims, the terms "first image data" and "second image data" are used therein to indicate the image data from the rear-facing camera 126 that is analyzed during the Calibration Procedure and the Alignment Procedure, respectively, since those two procedures are separated in time. Also, throughout the above description of trailer hitch assist system 170 and in the claims, the term "location" has been used consistently in connection with the real world (i.e., physical locations of reference object 320 and vehicle 100), and the term "position" has been used consistently in connection with the FOV of rear-facing camera 126 (e.g., pixel coordinates within the FOV). This is intended to avoid confusion between terms such as "first location" and "first position."

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s)

160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A hitch assist system, comprising:
a processor; and
a memory storing machine-readable instructions that, when executed by the processor, cause the processor to:
analyze first image data from a rear-facing camera of a vehicle to detect a reference object placed on the ground in a first location by a user and store a first position, within a field of view of the rear-facing camera, of the reference object, wherein the first location is beneath and in centered alignment with a hitch ball of the vehicle;
analyze second image data from the rear-facing camera to detect the reference object after it has been placed on the ground in a second location by the user and store a second position, within the field of view of the rear-facing camera, of the reference object, wherein the second location is beneath and in centered alignment with a trailer coupler of a trailer;
calculate a spatial relationship between the first and second locations based on the stored first and second positions and intrinsic and extrinsic parameters of the rear-facing camera; and
control the vehicle, based on the calculated spatial relationship, to back autonomously to a location that aligns the hitch ball and the trailer coupler to permit the trailer to be hitched to the vehicle.

2. The hitch assist system of claim 1, wherein the reference object is a disk.

3. The hitch assist system of claim 2, wherein the disk has a color that contrasts with the ground.

4. The hitch assist system of claim 2, wherein the disk has a diameter of between 4 and 20 inches.

5. The hitch assist system of claim 2, wherein the disk includes a powered light source that illuminates the disk.

6. The hitch assist system of claim 2, wherein the disk includes a phosphorescent material.

7. The hitch assist system of claim 1, wherein the rear-facing camera is a backup camera of the vehicle.

8. A non-transitory computer-readable medium for hitch assist and storing instructions that, when executed by a processor, cause the processor to:
analyze first image data from a rear-facing camera of a vehicle to detect a reference object placed on the ground in a first location by a user and store, in a memory, a first position, within a field of view of the rear-facing camera, of the reference object, wherein the first location is beneath and in centered alignment with a hitch ball of the vehicle;
analyze second image data from the rear-facing camera to detect the reference object after it has been placed on the ground in a second location by the user and store, in the memory, a second position, within the field of view of the rear-facing camera, of the reference object, wherein the second location is beneath and in centered alignment with a trailer coupler of a trailer;
calculate a spatial relationship between the first and second locations based on the stored first and second positions and intrinsic and extrinsic parameters of the rear-facing camera; and
control the vehicle, based on the calculated spatial relationship, to back autonomously to a location that aligns the hitch ball and the trailer coupler to permit the trailer to be hitched to the vehicle.

9. The non-transitory computer-readable medium of claim 8, wherein the reference object is a disk.

10. The non-transitory computer-readable medium of claim 9, wherein the disk has a color that contrasts with the ground.

11. The non-transitory computer-readable medium of claim 9, wherein the disk has a diameter of between 4 and 20 inches.

12. The non-transitory computer-readable medium of claim 9, wherein the disk includes a powered light source that illuminates the disk.

13. The non-transitory computer-readable medium of claim 9, wherein the disk includes a phosphorescent material.

14. A method, comprising:
analyzing first image data from a rear-facing camera of a vehicle to detect a reference object placed on the ground in a first location by a user and storing, in a computer memory, a first position, within a field of view of the rear-facing camera, of the reference object, wherein the first location is beneath and in centered alignment with a hitch ball of the vehicle;
analyzing second image data from the rear-facing camera to detect the reference object after it has been placed on the ground in a second location by the user and storing, in the computer memory, a second position, within the field of view of the rear-facing camera, of the reference object, wherein the second location is beneath and in centered alignment with a trailer coupler of a trailer;
calculating a spatial relationship between the first and second locations based on the stored first and second positions and intrinsic and extrinsic parameters of the rear-facing camera; and
controlling the vehicle, based on the calculated spatial relationship, to back autonomously to a location that aligns the hitch ball and the trailer coupler to permit the trailer to be hitched to the vehicle.

15. The method of claim 14, wherein the reference object is a disk.

16. The method of claim 15, wherein the disk has a color that contrasts with the ground.

17. The method of claim 15, wherein the disk has a diameter of between 4 and 20 inches.

18. The method of claim 15, wherein the disk includes a powered light source that illuminates the disk.

19. The method of claim 15, wherein the disk includes a phosphorescent material.

20. The method of claim 14, wherein the rear-facing camera is a backup camera of the vehicle.

* * * * *